Feb. 20, 1923.

U. A. MORIN 1,446,391

BREAD SLICER

Filed Apr. 18, 1922

U. A. Morin
INVENTOR

BY Victor J. Evans
ATTORNEY

WITNESS:

Feb. 20, 1923. 1,446,391
U. A. MORIN
BREAD SLICER
Filed Apr. 18, 1922   2 sheets-sheet 2
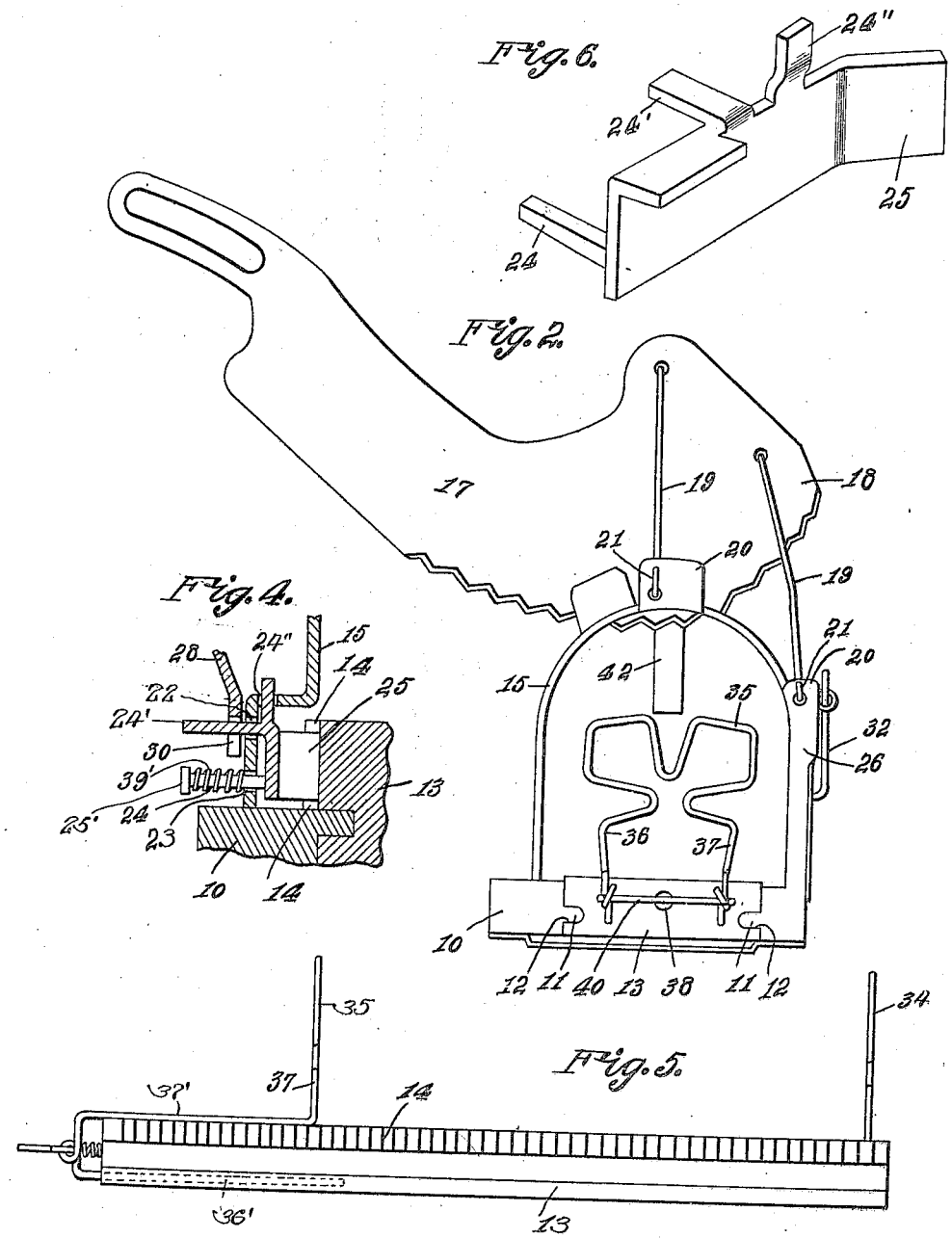

Patented Feb. 20, 1923.

1,446,391

UNITED STATES PATENT OFFICE.

URCISE A. MORIN, OF FARGO, NORTH DAKOTA.

BREAD SLICER.

Application filed April 18, 1922. Serial No. 554,692.

*To all whom it may concern:*

Be it known that I, URCISE A. MORIN, a citizen of the United States, residing at Fargo, in the county of Cass and State of North Dakota, have invented new and useful Improvements in Bread Slicers, of which the following is a specification.

This invention comprehends the provision of a machine for slicing bread, and has for its chief characteristic the provision of a cutting knife mounted for movement toward and away from the base of the machine, the loaf being supported upon a slide which is moved across the base step by step incident to the operation of the knife, so that the loaf is moved into proper position with relation to the knife subsequent to the cutting of each slice.

Another object of importance resides in the provision of a machine of this character, wherein the slide above referred to is provided with means for holding the loaf of bread immovably positioned upon the slide, the means being adjustable to accommodate loaves of different sizes.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 2 is an end elevation showing the inactive position of the cutting knife.

Figure 4 is a sectional view taken on line 4—4 of Figure 1.

Figure 5 is a detail view of the slide.

Figure 6 is an enlarged detailed view of the pawl.

Figure 1:
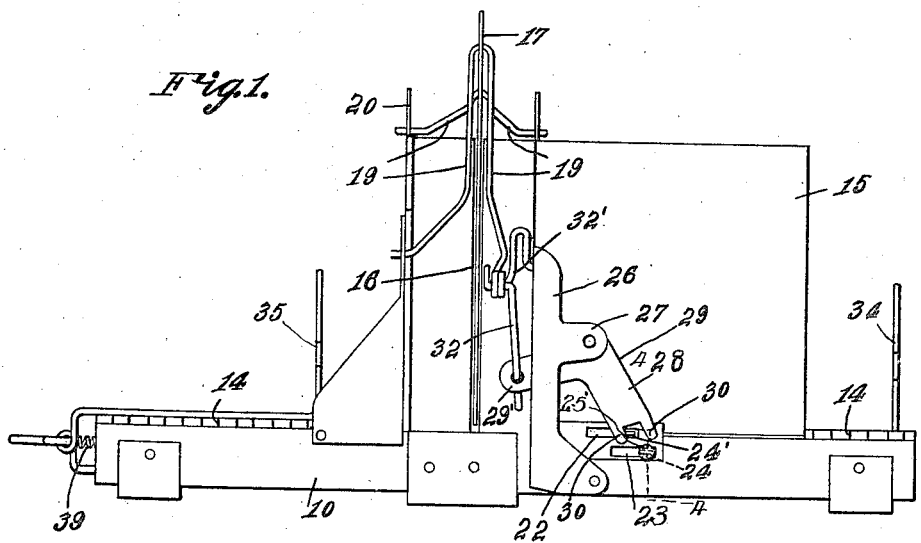
Figure 1 is a side elevation of the machine constructed in accordance with the invention.
Figure 3:
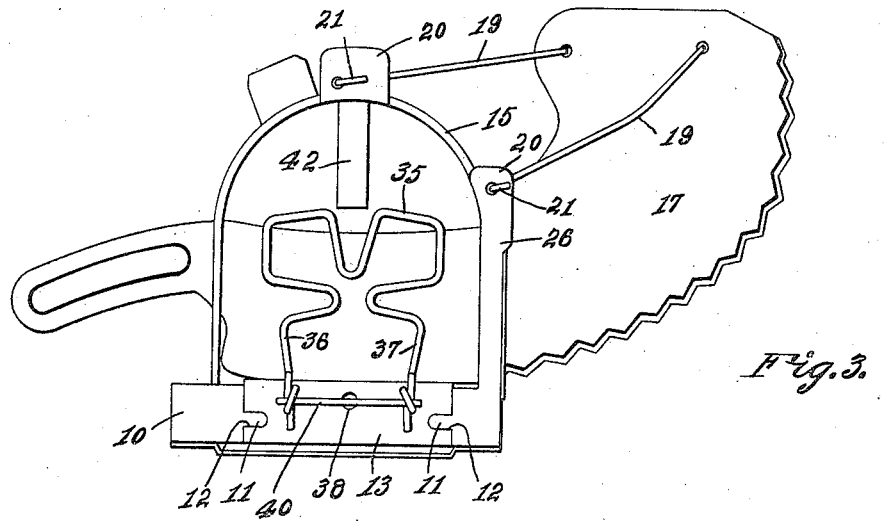
Figure 3 is a similar view, showing the active position of the knife.

Referring to the drawings in detail, the machine includes a base 10 which may be of any suitable material, and which may vary in size and configuration without departing from the spirit of the invention, the base being formed to provide opposed tongues 11 which are received by the longitudinal grooves 12 provided in the edges of the slide 13. This slide has secured thereto a rack bar 14 which is co-extensive in length with the length of the slide, and the use of this bar will be hereinafter described. Mounted upon the base 10 is an arch-shaped cover or casing 15 which may be constructed from any suitable material, and this cover is provided with a slot 16 through which the cutting knife 17 operates. This knife is of usual construction, except that at one end of the knife is offset as at 18, and this offset portion is provided with spaced openings for the reception of a pair of yokes 19 which supports the cutting blade in a manner illustrated. The casing or cover 15 is formed with spaced pairs of apertured lugs 20 and each pair receives the offset extremities 21 of the adjacent yoke. In this manner, the yokes are not only pivotally supported by the cover or casing 15, but the cutting blade also pivotally supported by the yokes, so that the blade can be conveniently and easily manipulated through the slot for the purpose of slicing the loaf as will be readily understood.

The casing or cover 15 at a point adjacent the base is provided with spaced parallel slots 22 and 23 respectively, and operating in these slots are extensions 24, 24' and 24" of a resilient pawl 25, the pawl being arranged within the casing or cover 15 to cooperate with the teeth of the rack bar 14 in a manner to be presently described, the extension being provided with a head 25' and said extension 24 carrying a coil spring 39' having its end convolutions bearing against the head and adjacent sides of the cover respectively. Rising from the base is a standard 26 formed to provide an offset apertured lug 27, and fulcrumed on this lug is a bell crank lever 28. The branch 29 of this bell crank lever is bifurcated at its lower end, so that the extension 22 of said pawl is received by the separated portions 30 defined by said bifurcation. The other branch 29' of the bell crank lever is connected to the adjacent end of a rod 32, and this rod has its opposite end associated with a crank-like portion 32' formed by one limb of one of the yokes which supports the cutting knife in a manner above described. By reason of this construction, it is obvious that when the cutting blade is elevated to an inactive position, the pawl 25 is shifted longitudinally of the slide 13, idling over the teeth of the rack bar, and incident to the depression or movement of the blade in the direction of the slide, the pawl 25 engages the teeth of the rack bar, moving the slide on the base a distance equal to the width of the slice severed from the loaf, thereby positioning the loaf in proper relation to the cutting blade for its next operation. Incidentally, the slices are of uniform thickness.

The slide 13 is equipped with means for holding the object to be cut or severed fixed relatively to the slide, and this means includes what may be termed spaced clamping members of identical construction, and indicated at 34 and 35 respectively. The member 34 rises from the base and fixed thereto, while the member 35 forms part of spaced substantially U-shaped members 36 and 37 respectively. One limb of each of these members slides through a longitudinal bore provided in the slide 13, as at 36' while the other corresponding limbs of these members repose upon the upper surface of the slide 13, as at 37'. The slide is provided with an additional bore 38 which receives a coiled spring 39, one end of which is suitably secured to the slide, and the opposite end connected with a cross bar 40 which connects the U-shaped members 36 and 37 respectively. Consequently, the member 35 is susceptible of movement toward and away from the member 34, so that loaves of different lengths can be arranged upon the slide and clamped between these members, the spring 39 holding the member 35 under tension for this purpose. In addition to these clamping members 34 and 35 respectively, I further make use of a leaf spring 42 which is arranged within the casing or cover 15 and disposed to bear against the adjacent surface of the loaf to hold it down upon the slide. Manifestly, the machine is very simple in construction, and can be very easily and conveniently manipulated in a manner to cut the object placed upon the slide into pieces of uniform size, also eliminating unnecessary handling of the object for this purpose which is advantageous from a sanitary point of view.

While it is believed that from the foregoing description, the nature and advantages of the invention will be readily apparent, I desire to have it understood that I do not limit myself to what is herein-shown and described, and that such changes may be resorted to when desired, as fall within the scope of what is claimed.

What I claim is:—

A machine of the character described comprising a base formed to provide a pair of opposing tongues, a sliding element co-extensive with the base and being provided with longitudinal grooves loosely receiving the tongues, a rack bar co-extensive with the sliding element and being secured to one longitudinal edge thereof, a slotted casing secured to the base, a spring pressed pawl contacting said rack bar, an extension arranged on said pawl and projecting through one of the slots of the casing, a bell cranked lever having one of its branches bifurcated and said branch engaging said extension for imparting a lateral movement thereto, means attached to the edge of said base to support the bell crank arm, a cutting blade, yokes supporting the blade for movement toward and away from said sliding element, means for imparting a reciprocatory motion to said bell crank arm through the medium of one of said yokes, clamping members secured to the ends of said sliding element and the top of the casing and one of said clamping members being adjustable as and for the purpose specified.

In testimony whereof I affix my signature.

URCISE A. MORIN.